United States Patent
Murakami et al.

(10) Patent No.: US 8,646,034 B2
(45) Date of Patent: Feb. 4, 2014

(54) BOOTSTRAP OF NFC APPLICATION USING GBA

(75) Inventors: Shingo Murakami, Kanagawa (JP); Toshikane Oda, Tokyo (JP)

(73) Assignee: Telefonaktiebolaget LM Ericsson (Publ) (SE)

( * ) Notice: Subject to any disclaimer, the term of this patent is extended or adjusted under 35 U.S.C. 154(b) by 611 days.

(21) Appl. No.: 12/935,721

(22) PCT Filed: Apr. 22, 2008

(86) PCT No.: PCT/JP2008/058230
§ 371 (c)(1),
(2), (4) Date: Sep. 30, 2010

(87) PCT Pub. No.: WO2009/130796
PCT Pub. Date: Oct. 29, 2009

(65) Prior Publication Data
US 2011/0029777 A1   Feb. 3, 2011

(51) Int. Cl.
*G06F 17/30* (2006.01)
*G06F 7/04* (2006.01)
*G06F 12/00* (2006.01)
*G06F 12/14* (2006.01)
*G06F 13/00* (2006.01)
*G11C 7/00* (2006.01)
*G06F 7/16* (2006.01)

(52) U.S. Cl.
USPC ........ 726/2; 726/17; 726/18; 726/21; 726/27; 455/41.1

(58) Field of Classification Search
None
See application file for complete search history.

(56) References Cited

U.S. PATENT DOCUMENTS

| | | | |
|---|---|---|---|
| 2003/0208386 A1* | 11/2003 | Brondrup | 705/5 |
| 2006/0156388 A1* | 7/2006 | Stirbu et al. | 726/4 |
| 2006/0253592 A1 | 11/2006 | Oashi et al. | |
| 2007/0203969 A1 | 8/2007 | Wakasa et al. | |
| 2008/0095361 A1* | 4/2008 | Wifvesson et al. | 380/44 |
| 2009/0170432 A1* | 7/2009 | Lortz | 455/41.1 |

FOREIGN PATENT DOCUMENTS

| | | |
|---|---|---|
| JP | 2005-56150 A | 3/2005 |
| JP | 2007-66042 A | 3/2007 |
| JP | 2008-27179 A | 2/2008 |
| WO | WO 2005/072002 A1 | 8/2005 |

OTHER PUBLICATIONS

International Search Report, PCT/JP2008/058230, Dec. 22, 2008.

* cited by examiner

*Primary Examiner* — Nasser Goodarzi
*Assistant Examiner* — Mary A Kay
(74) *Attorney, Agent, or Firm* — Myers Bigel Sibley & Sajovec, P.A.

(57) ABSTRACT

The present invention provides a bootstrap system comprising a network system and a mobile handset where the mobile handset can easily receive services of NFC bootstrap application. The handset is effectively authenticated after a bootstrap controller in the network verifies whether a user credential derived in the mobile handset and a user credential separately received from a network server are equal. The application setting is sent to a handset from a bootstrap controller via ad-hoc near field communication (NFC) between the mobile handset and the bootstrap controller. Then the user of the mobile handset can receive various services of the NFC application after the network server delivers the user credential to the service devices with NFC interface.

11 Claims, 10 Drawing Sheets

FIG. 4A
Architecture

FIG. 4B

BOOTSTRAP OF NFC APPLICATION USING GBA

CROSS REFERENCE TO RELATED APPLICATION

This application is a 35 U.S.C. §371 national stage application of PCT International Application No. PCT/JP2008/058230, filed on 22 Apr. 2008, the disclosure and content of which is incorporated by reference herein in its entirety. The above-referenced PCT International Application was published in the English language as International Publication No. WO 2009/130796 A1 on 29 Oct. 2009.

TECHNICAL FIELD

This present invention relates to bootstrap technology in which a mobile handset in the network system receives various services of near field communication (NFC) technology based on GBA.

BACKGROUND

Near Field Communication (NFC) technology such as FeliCa (Felica stands for Felicity Card; a contact-less RFID chip smart card system) is becoming one of key function technologies provided on mobile handsets. There are various service scenarios using NFC on mobile handsets. Typical examples are Mobile FeliCa services provided by the Japanese mobile operators, which include payment functions to buy goods at a shop using a mobile handset. Amongst others, Mobile FeliCa is used as an instant and convenient communication means to transfer media content files from one device (e.g., PC, mobile handset, AV device) to another. It is thus foreseen that NFC technologies will be used in a variety of different scenarios in media content distribution and sharing.

One of the NFC applications is a service after a passenger checks in at the airport. There is a scenario at the airport where after check-in, the passenger can pass through predetermined gates and unlock doors for the lounge by touching an electric key to a predetermined region of the gates or the doors of the lounge in the airport. This can be imagined along with recent strengthening security. This will be probably realized by using IC cards, etc. However, if the function of this electronic key can be installed in passenger's mobile terminal with NFC technology, it is effective because an IC card does not need to be issued.

As another example, NFC technology can be applied to a service after a customer checks in at a hotel. This application using the mobile terminal after the hotel check-in is not yet realized. However, if the mobile terminal can be applied to the electric key, the customer may use his/her mobile terminal as a hotel-key and other keys for the use of utilities in the hotel. Moreover, as the example of the application to the airport, it is effective because an IC card do not need to be issued.

Figure 1A:
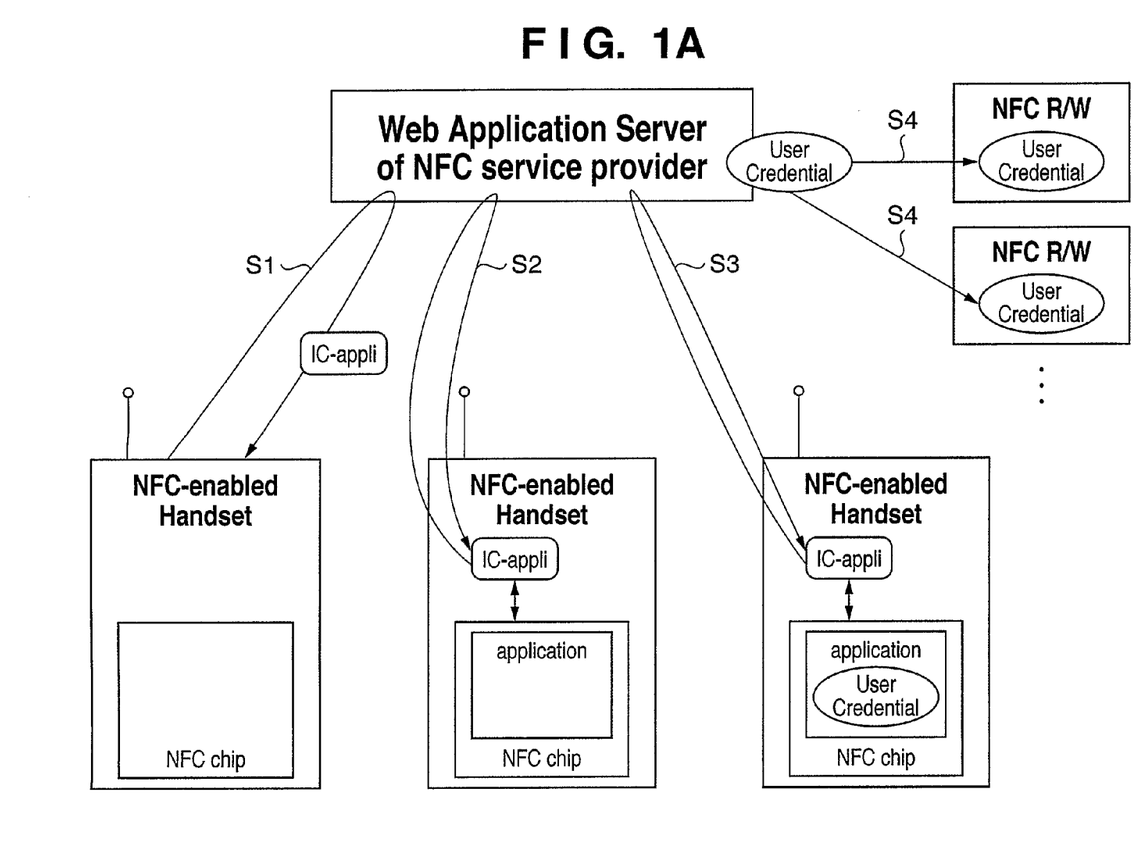
FIG. 1A shows an example of existing bootstrap procedure for target NFC service scenarios.

Next, the present typical NFC service is explained using FIG. 1.

Step-S1: The user must download an (so-called) IC-application (software module) from a web application server run by the NFC service provider. An IC-application is a Java or C application that is dedicated for an individual NFC service (e.g. the airport gate service or the hotel door-key service), and it implements the special APIs for accessing a NFC chip inside the mobile handset as described in the next step.

Figure 1B:
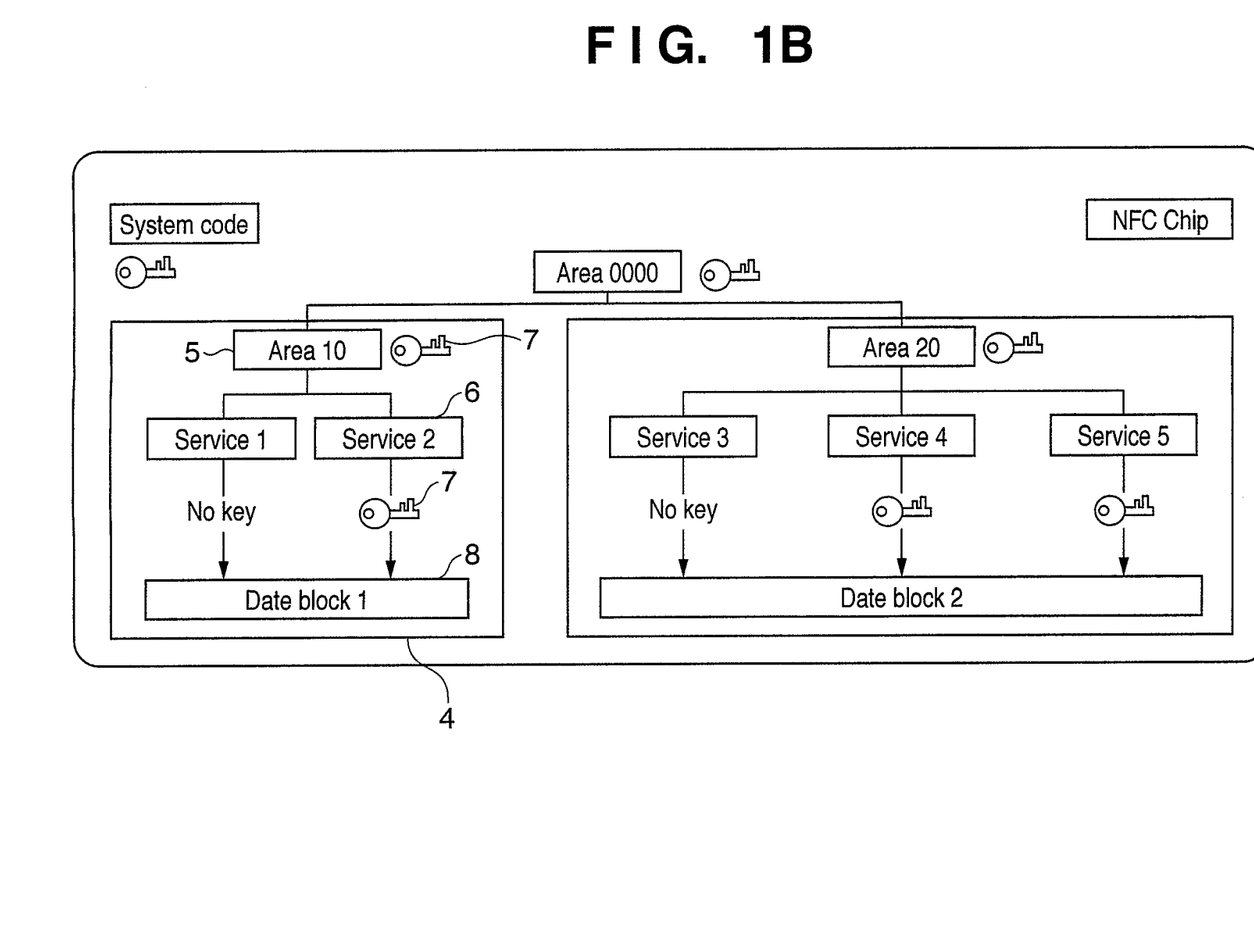
FIG. 1B shows an example of existing NFC application setting by installation in a NFC chip.

Step-S2: After the IC-application is downloaded, the user needs to start the IC-application to install "application setting" to the NFC chip. The application setting is required data set to install a NFC application on the chip and they include application-specific access keys, area codes, and service codes [2]. The access keys serve as application firewalls that prevent unauthorized access to the application area, for example, to prevent NFC readers/writers without the access keys from accessing the application area. The IC-application downloads the application setting on-line from the web application server and installs them on the chip. FIG. 1B shows a block diagram of an NFC Chip. An area 4 is an individual NFC application installed in the NFC chip. An application-specific area code, an application-specific service code and an application-specific access keys are shown in blocks 5, 6 and 7 respectively. A user credential is stored in Data block-A, 8 in the next step-S3.

Step-S3: In case of the above-mentioned NFC service scenarios, the user is also required to register user information via web interface provided by the IC-application so that the NFC service provider can identify the user within a system. To this end, the service provider issues a corresponding user credential, which could be a unique token, ID, or whatever that identifies the user. The user credential is then returned to the IC-application to be stored in the Data block area managed by the NFC application (FIG. 1B).

Step-S4: In case of the above-mentioned NFC service scenarios, the derived user credential may also be copied to relevant NFC readers/writers placed in a real environment (e.g., NFC gates in the airport, electronic door key devices in the hotel building). This user credential delivery is performed over the corresponding IT system, which is secure enough.

As mentioned above, the following problems should be considered when bootstrapping the NFC application on mobile handsets.

First, it is very cumbersome for the user to download the IC-application or setting (e.g., in front of the airline check-in counter or the hotel reception). It requires at least a few steps and time for clicking web links to reach the target web site of the NFC service provider. Japanese IT journalist [3] points out that the biggest hurdle to prevent dissemination of Mobile FeliCa services is that the users are required to conduct too-cumbersome/too-complex configuration of Mobile FeliCa applications, which includes download of IC-application and setup of the application as described through Steps S1-S3 above.

Second, as discussed in Step-S3, the NFC service provider needs to develop a secure identification system for this type of NFC services in order to securely identify each user and to distribute the user credential to relevant NFC R/W devices. CapEx and OpEx for such a secure identification system will be huge, which may discourage new entry of NFC service providers to this type of NFC services. Note that this would not be a problem for some potential NFC service providers that already have their own customer identification system such as airline companies, each of which has a mileage point service that is tightly coupled with customer ID number. In this case, the user credential used in Steps-S3 and S4 can be identical to that customer ID number. However, this should be a problem for the rest of potential NFC service providers who don't have any customer identification system.

For example, amusement park companies like Disney Land may not have such an identity system, but this type of user-tailored NFC services is definitely useful and attractive for the users and providers of amusement parks.

SUMMARY

The present invention provides simple solutions for the above issues.

It is a first object of the invention to provide a network system where a NFC service can be easily configured for a particular user and bootstrapped in a mobile handset and in a group of NFC (Application) R/W devices that are to serve the user. Therefore, the user is not annoyed by cumbersome operations of downloading predetermined NFC application software explicitly.

It is another object of the invention to effectively authenticate the user of a mobile handset using user credentials (a common key), which are dynamically established in both the mobile handset and a server. For example, in the first embodiment of the invention, a server in the network system first configures a NFC service made personalized for the user that is associated with a service identity. The user then puts his/her mobile handset over an NFC interface of a bootstrap controller. Then, the mobile handset derives a unique user credential from a key supplied by UICC and a set of ID information including the service identity. A server in the network system also derives the same unique user credential as the one derived in the mobile handset using a key supplied by a bootstrap server function in the network system and a set of ID information including the service identity.

The server delivers the user credential and the NFC application setting to the bootstrap controller. Using for instance the ad-hoc near field communication, the bootstrap controller compares the user credential derived in the mobile handset with the user credential delivered from the server. If both user credentials are equal, the bootstrap controller sends the NFC application setting including the service identity to the mobile handset. The mobile handset then installs the user credential and the NFC application setting to the local NFC chip.

For another example, in the second embodiment of the invention, a server in the network system first configures a NFC service made personalized for the user that is associated with a service identity. The user then puts his/her mobile handset over an NFC interface of a bootstrap controller. Then, the bootstrap controller derives a unique user credential from a key supplied by UICC, a device identity supplied by the mobile handset, and a set of ID information including the service identity. The mobile handset requests the user credential from a server in the network system by supplying the said set of ID information generated and supplied by the bootstrap controller to the server in the network system. The server in the network system derives the same unique user credential as the one derived in the bootstrap controller from a key supplied by a bootstrap server function in the network system and the said set of ID information supplied by the mobile handset. The user credential derived in the server is then delivered to the mobile handset. Using for instance the ad-hoc near field communication, the bootstrap controller compares the user credential delivered to the mobile handset with the user credential derived in the bootstrap controller. If both user credentials are equal, the bootstrap controller sends the NFC application setting to the mobile handset. The mobile handset then installs the NFC application setting including the service identity and the user credential.

In both embodiments, the user can receive the personalized NFC services after the server delivers necessary data including the service identity and the user credential to each of a plurality of NFC R/W devices with bootstrap support function (for example, NFC-capable electric gates in the airport) via a communication line between the server and the plurality of NFC R/W devices with the bootstrap support function device. To which NFC R/W devices the server delivers the said data is determined by the service identity because the group of the NFC R/W devices is determined when the server initially configures a personalized NFC service for the user's attributes.

This invention has the following advantages: The user is able to complete a bootstrap of NFC applications by simply putting the mobile handset on the NFC R/W device for a short time period to complete the bootstrapping procedure electronically. The user doesn't need to take very cumbersome procedures and configurations such as downloading the applications and user registration via web browser, etc., which are required in the existing system. The NFC service provider can flexibly set up a NFC R/W device group according to any type of the service natures such as user preference or membership grade etc. Since the user credential established during the bootstrap is only distributed to these determined NFC R/W devices which is used as a service access key on these NFC R/W devices, the NFC service provider is able to construct secure and personalized NFC service infrastructure that has not been practiced in the prior arts.

The NFC service provider does not need to develop a secure identification system by itself for the user-tailored NFC services, which will be very costly. By using the present invention, however, it only needs to rely on and re-use the 3GPP's secure identification system through GBA. The invention could also ease charging to the user for the NFC services through user account information maintained by the mobile operator.

Possible extensions of the invention can be considered as follows:

The principles and mechanism proposed in this invention can be also combined with the key establishment mechanism between UICC and a terminal specified in 3GPP TS 33.110 [6] instead of [1]. For example, TS33.110 architecture can be applied to the present invention if the UICC implements the Bootstrap Support Function that is shown outside the UICC in FIG. 4A.

DETAILED DESCRIPTION

The various features of the invention will now be described with references of the figures, in which similar elements are identified with the same reference numbers.

One example of services in the first embodiment of the invention, a ticket-less service in the airport is presented.

A terminal computer is equipped in an airlines check-in counter in the airport. A passenger who is checking-in has his/her mobile handset. It is assumed that both the terminal computer at the check-in counter and the passenger's mobile handset have an NFC capability that enables two-way communication between the terminal computer and the mobile handset. Nearing completion of the check-in, the airline staff offers ticket-less service to the passenger. With the service, the passenger is able to pass through a number of gates in the airport without carrying any paper boarding ticket but by only waving the NFC mobile handset over the NFC-capable electric gates. A set of the gates that the passenger can go through is selected to this specific passenger.

For example, the passenger should be able to go through a main departure gate, all toilet gates in the north wing building, a lounge gate of the airlines (i.e. the passenger is a Gold level member for Star Alliance!), and a boarding gate for the passenger, etc. To complete the check-in procedure with the ticket-less service, the check-in counter staff asks the passenger to put his/her mobile handset on the NFC interface connected to the counter's terminal computer. Since all the gates in the airport have a built-in NFC chip with R/W (Reader/Writer) interface, the passenger can pass through the authorized gates by only touching the mobile handset. Each gate authenticates the passenger by checking if the user credential presented by the mobile handset matches any one in the user credential lists delivered from the IT system.

Next, an explanation about how the NFC application setting is installed on the mobile handset and how the selected gates work as the application service after the check-in will be given. To clarify the effects of the proposed mechanism at the highest level, referring to FIG. 2 and FIG. 3, compare the before-bootstrap state to the after-bootstrap state in the mobile handset and the NFC R/W devices.

Figure 2:
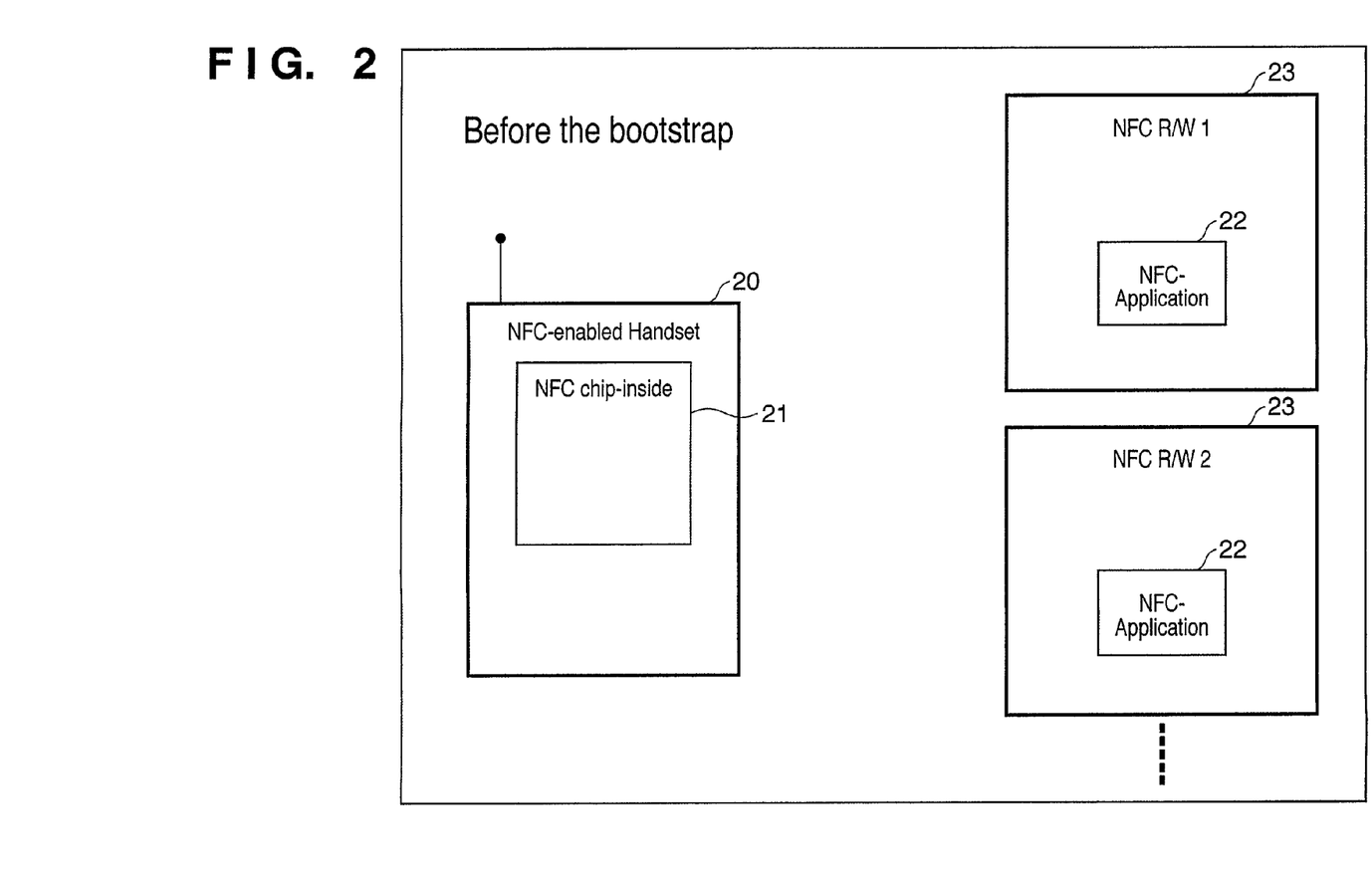
FIG. 2 shows a state of an NFC-enabled mobile handset and a plurality of NFC R/W devices before bootstrapping in the first embodiment.

As shown in FIG. 2, before the bootstrap, there is no application-related data in a NFC chip-inside 21 on a mobile handset 20. On the other hand, it is assumed that a NFC application has been already installed on the NFC (Application) R/W devices 23. Hereinafter, this NFC application is named "NFC-Application" 22. The user credential of this mobile handset user has not been delivered to the R/W devices 23 yet. Note that the NFC-Application 22 in the NFC R/W devices 23 has a capability to access to the corresponding NFC-Application in the NFC chip-inside 21 on the remote mobile handset 20 via NFC (R/W) interface because it is aware of the application-specific access keys and area/service codes.

Figure 3:
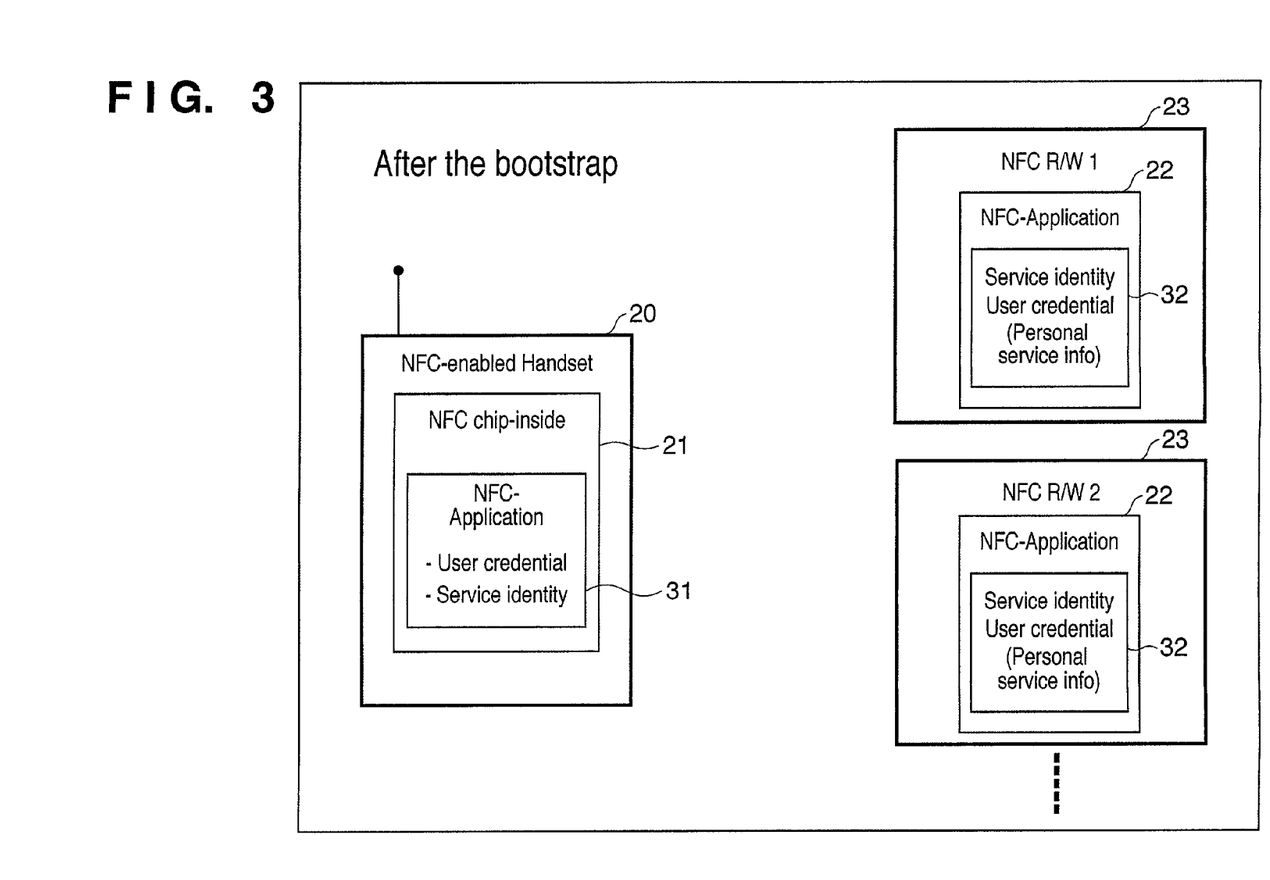
FIG. 3 shows a state of an NFC-enabled mobile handset and a plurality of NFC R/W devices after bootstrapping in the first embodiment.

As shown in FIG. 3, after the bootstrap, in the mobile handset 20, NFC-Application 22 (i.e. the application setting of NFC-Application) is now installed in the NFC chip 21 and the service identity and the user credential 31 is also stored in the Data block managed by that NFC-Application. In the NFC R/W devices 23, the service identity, the user credential and possibly other personal service information 32 are delivered to the NFC-Application 22 as well. Now the NFC-Application 22 in the NFC R/W devices 23 can access to this NFC-Application in the mobile handset's chip over NFC (R/W) interface.

Figure 4A:
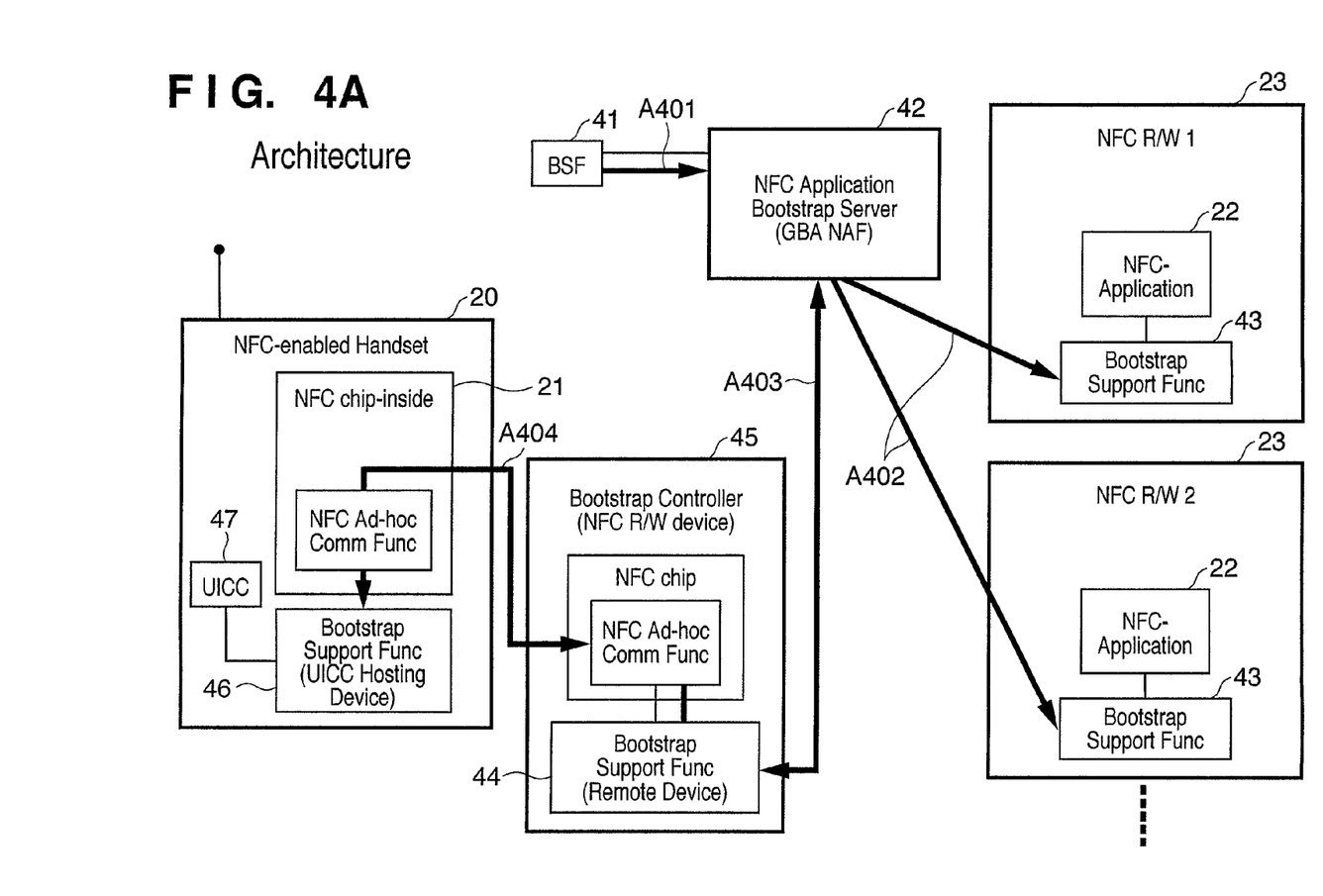
FIG. 4A shows an example of functional architecture when a bootstrap procedure is performed in the first embodiment.

Next, architecture for the solution is explained. In order to bootstrap that way, the present invention introduces several functions in the relevant elements, such as Bootstrap Server Function 41, NFC Application Bootstrap Server 42, Bootstrap Support Functions 43, 44 and 46, Bootstrap Controller 45, and UICC 47 as shown in FIG. 4A.

NFC Application Bootstrap Server 42 is the web application server of the NFC service provider. It is involved into the main architectural procedures indicated by A401, A402, A403 and A404 with following functionalities:

To act as "NAF Key Centre" to obtain a Ks_ext_NAF from BSF, which is then used to derive the user credential for a user (A401).

To deliver the derived user credential, etc. to NFC R/W devices through a secure IT system of the NFC service provider (A402).

To send the application setting, which is a required data set to install NFC-Application to a NFC chip, to the mobile handset via Bootstrap Controller device 45 (A403 and A404).

To send the user credential to a Bootstrap Controller 45 so that the Bootstrap Controller 45 can authenticate the mobile handset to verify if the mobile handset is really an intended piece of user equipment with the user credential (A403 and A404).

Bootstrap Controller 45 is a device with a built-in NFC chip that is placed where the mobile handset is about to bootstrap. Bootstrap Controller 45 has Bootstrap Support Function 44 that has the following functionalities:

To configure a NFC service made personalized for the user in the server 42 (A403). A service identity associated with the configured service is sent to the Bootstrap Support Function 44.

To establish a NFC link (A404) with the mobile handset 20 using for instance NFC ad-hoc communication feature [5]. This feature has been introduced in NTT DoCoMo 903i series [4], which allows OBEX communication between the two NFC devices.

To receive the user credential from the NFC Application Bootstrap Server 42. In this sense, the Bootstrap Support Function 41 acts as a "Remote Device" defined in 3GPP TS33.259[1]. The user credential is used to authenticate the mobile handset 20 to verify if the mobile handset 20 is really an intended piece of user equipment having the user credential.

To forward the application setting from the NFC Application Bootstrap Server 42 to the mobile handset 20 over the NFC link.

Bootstrap Support Function 46 in the mobile handset 20 is a counterpart function to the one in Bootstrap Controller 45 and has the following functionalities:

To derive a key data (Ks_ext_NAF) from a local UICC 47 to further derive the user credential. In this sense, it acts as a "UICC Holding Device" defined in GBA TS33.A.

To establish an NFC link with Bootstrap Controller 45 using said NFC ad-hoc communication feature. Then, it is to be authenticated to a Bootstrap Controller 45 with the derived user credential.

To receive the application setting for an NFC-Application from the Bootstrap Controller 45 and install them on the local NFC chip-inside. Then, the user credential and the service identity are stored inside Data block area of NFC application.

The Bootstrap Support Function 43 in the NFC R/W devices 23 has the following functionalities:

To receive the user credential, etc. from NFC Application Bootstrap Server 42 and to pass it to the local NFC-Application.

Figure 4B:
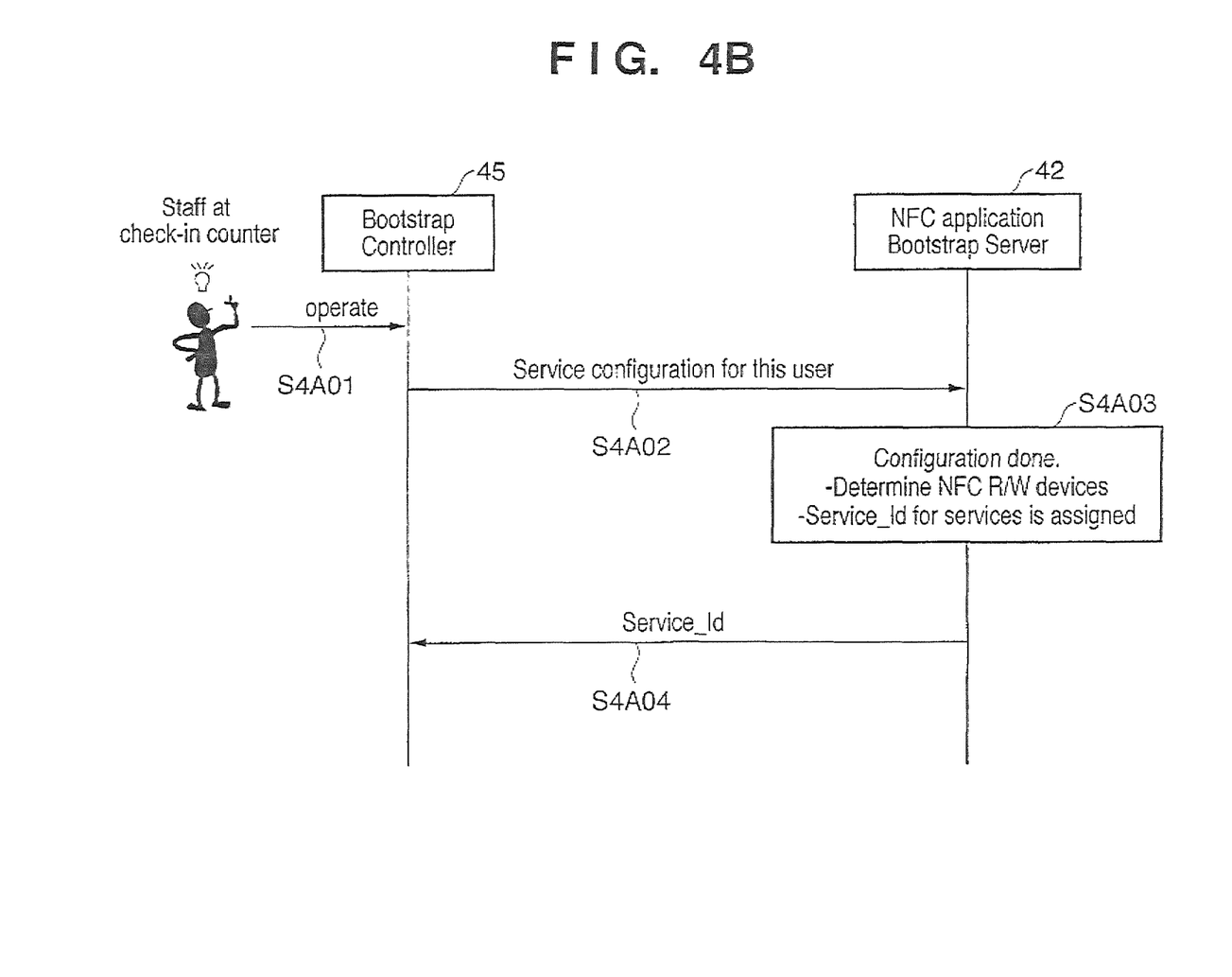
FIG. 4B shows an example of a procedure of configuring a NFC service made personalized for a user.

Before entering an actual bootstrapping procedure, the following steps are necessary to configure a service for a user which is shown in FIG. 4B.

Step-S4A01: A staff at the check-in counter operates Bootstrap Controller 45 of a terminal computer.

Step-S4A02: While making a check-in, the staff configures a NFC service for the user using the Bootstrap Controller 45. The actual service configuration based on what kind of attributes the user belongs to as service information in a NFC Application Bootstrap Server 42.

Step-S4A03: The configuring service is done at the NFC Application Bootstrap Server 42 by using the service information from the bootstrap controller 45, and a service identity (Service_ID) is generated. The configuring service includes assigning and associating the service identity (Service_Id) with the service and determining NFC R/W devices 23 that the user's mobile handset (20) can access. (Then the determined NFC R/W devices are recognized as a group of NFC R/W devices.) For example, if the user is a Gold member of an airline company, the user should be able to open the gate of a lounge room of the airline company, which means the Bootstrap Server delivers the user credential to the lounge room gate device in addition to other gates.

Step-S4A04: The Service_Id, which is generated in the NFC Application Bootstrap Server 42, is return to the Bootstrap Controller 45 of the terminal computer.

Figure 5:
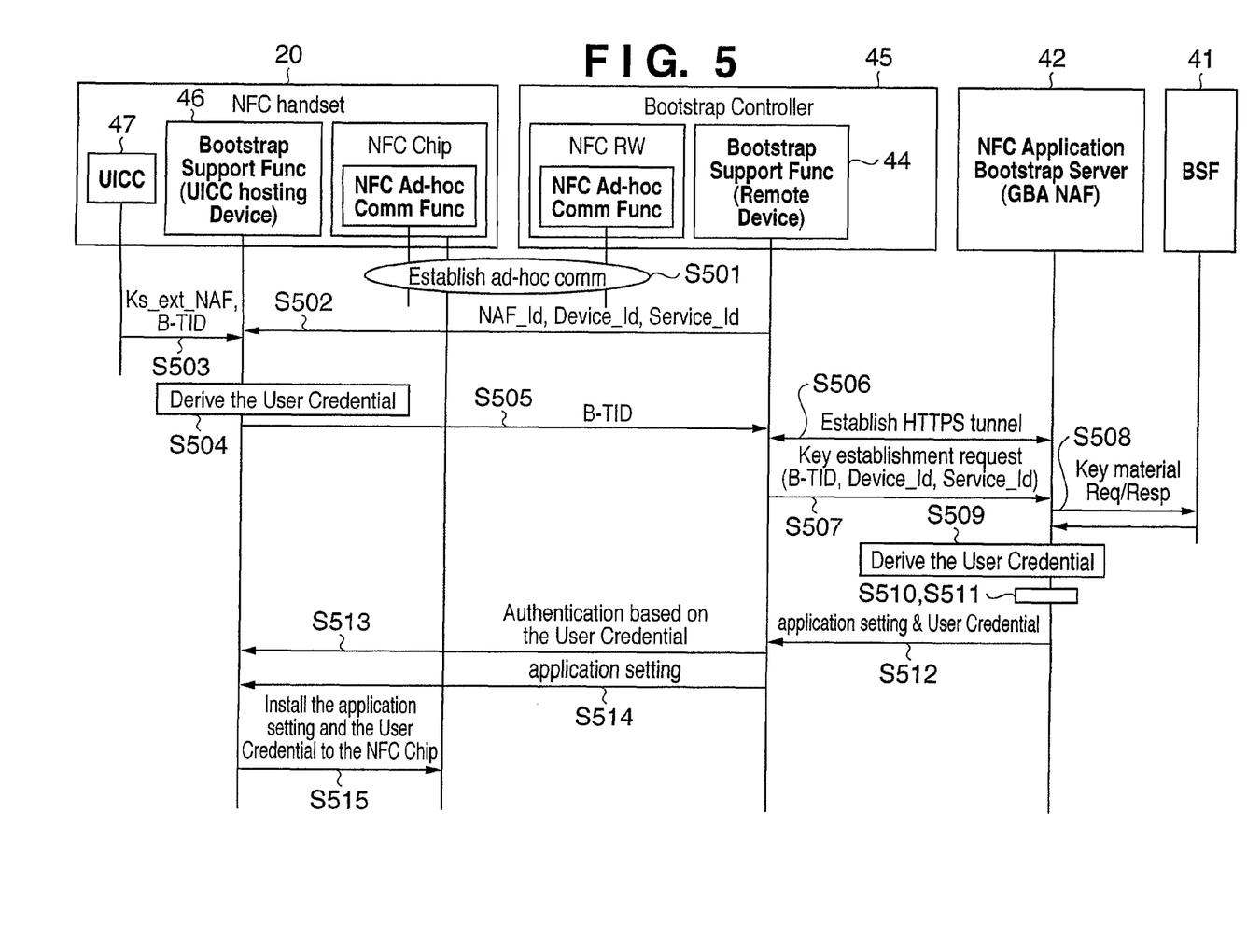
FIG. 5 shows an example of a detailed procedure of the first embodiment.
Figure 6:
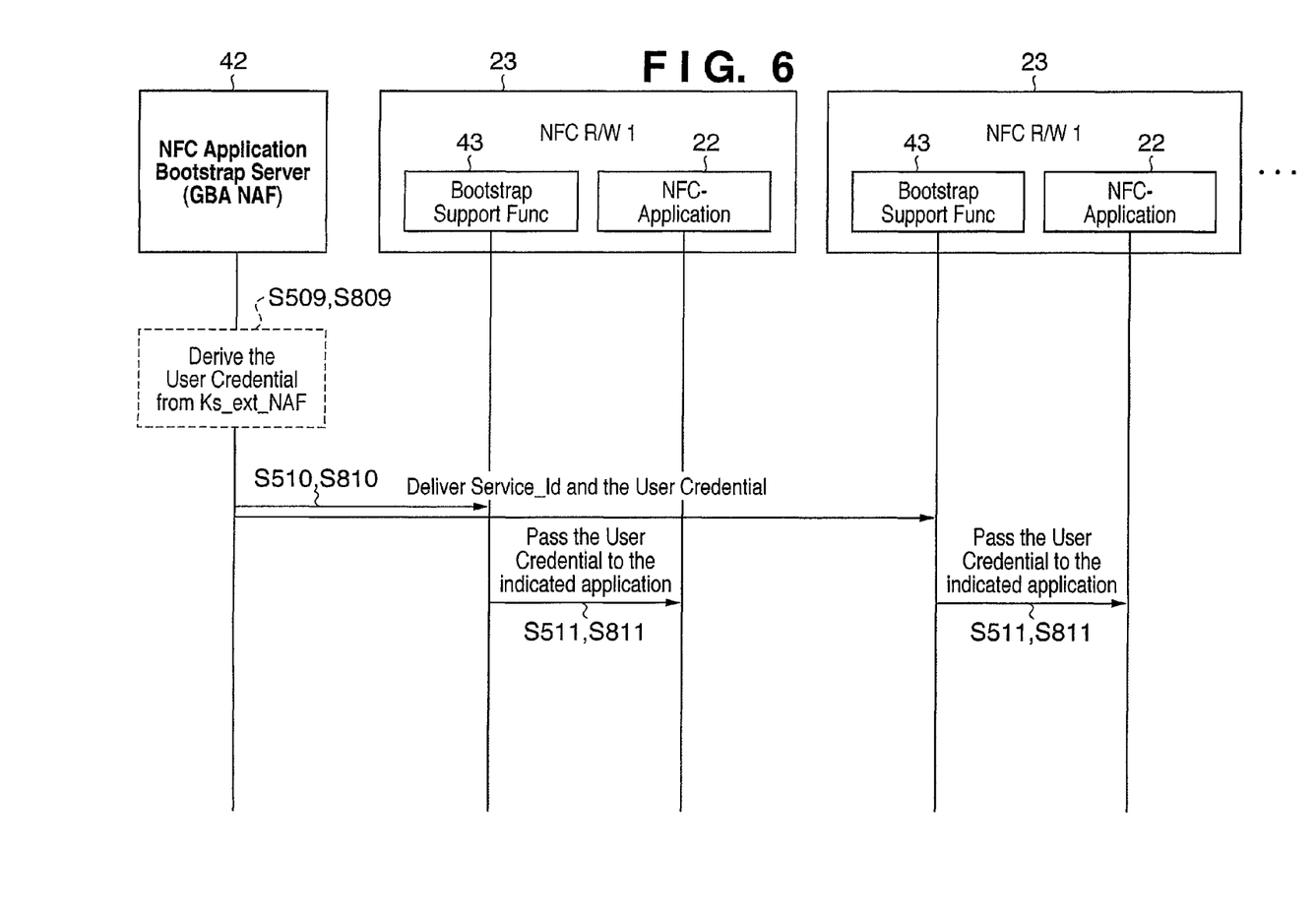
FIG. 6 shows an example of a detailed procedure for Steps S510 and S511 of the first embodiment, and for Steps S810 and S811 of the second embodiment.

A detailed example procedure is shown in FIGS. 5 and 6.

Step-S500: (This step is not presented in FIG. 5) It is a precondition that the UICC (47) in the mobile handset (20) runs a GBA bootstrap procedure with Bootstrap Support Function (41) before following steps. Otherwise, the mobile handset runs it when necessary. For example, to complete the check-in procedure with the ticket-less service, the counter staff asks the passenger to wave his/her mobile handset 20 (or place it for a short time period) over an NFC interface connected to the counter's terminal computer acting as Bootstrap Controller 45.

Step-S501: The user places the mobile handset 20 over NFC ad-hoc communication interface (including NFC R/W devices) of the Bootstrap Controller 45, which triggers Bootstrap Support Function 46 in the Bootstrap Controller 45 to establish the NFC ad-hoc communication link to the counterpart function in the mobile handset 20. As a result, two Bootstrap Support Functions 46, 44 in the devices (the mobile handset 20 and Bootstrap Controller 45) start to communicate over the NFC ad-hoc communication link.

Step-S502: The Bootstrap Support Function 44 of the Bootstrap Controller 45 (acting as a GBA Remote Device) initiates a bootstrap of NFC-Application by sending NAF_Id of the NFC Application Bootstrap Server 42, Device_Id and Service_Id to the mobile handset 20. In this case, Service_Id is a unique service identifier of the NFC Service for the user, Device_Id is the identifier of the Bootstrap controller 45, and NAF_Id is the identifier of the NFC Application Bootstrap Server 42.

Step-S503: A Bootstrap Support Function 46 of the mobile handset 20 (acting as GBA UICC Hosting Device) requests data including key data (Ks_ext_NAF) and key reference (B-TID) for the NAF_Id from the UICC 47 in a bootstrap procedure. If there is no valid Key reference (B-TID) in the UICC 47, the UICC 47 runs a GBA bootstrap procedure with the Bootstrap Support Function 46 of the mobile hand set 20. The UICC 47 returns new data including the key data (Ks_ext_NAF) and the key reference (B-TID) to the Bootstrap Support Function 46 of the mobile handset 20.

Step-S504: A Bootstrap Support Function 46 in the mobile handset 20 (acting as GBA UICC Hosting Device) derives the user credential from the key data (Ks_ext_NAF), the key reference (B-TID), Device_Id, and Service_Id.

Step-S505: The mobile handset 20 returns the reference (B-TID) to the Bootstrap Controller 45.

Step-S506: the NFC Application Bootstrap Server 42 (acting as GBA NAF) establishes an HTTPS tunnel.

Step-S507: The Bootstrap Controller 45 sends a request to the NFC Application Bootstrap Server 42 within the HTTPS tunnel. The request message contains the key reference (B-TID), Device_Id, and Service_Id, which are required to derive the user credential.

Step-S508: The NFC Application Bootstrap Server 42 contacts the Bootstrap Server Function 41 and sends the key reference (B-TID) and NAF_Id in a key material request. The Bootstrap Server Function 41 returns the requested key materials including the key data (Ks_ext_NAF).

Step-S509: The Bootstrap Server 42 derives the user credential from the key data (Ks_ext_NAF), the key reference (B-TID), Device_Id, and Service_Id.

Step-S510: Referring to FIG. 6, NFC Application Bootstrap Server 42 delivers the user credential and the Service_Id to NEC R/W devices 23 determined by the Service_Id through secure IT system of the NFC service provider. In addition to these parameters, the NFC Application Bootstrap Server 42 may also send other personal service information to the NFC R/W devices 23 such as username (e.g. to display user's name on gate display), script codes to dynamically program NFC R/W devices to provide personalize services, user's age/sex, flight time, passport number, Star Alliance Gold member ID, etc. According to this information, the NFC R/W devices 23 could provide the personalized services.

Step-S511: Referring to FIG. 6, Bootstrap Support Function 43 of the NFC R/W devices 23 passes the received information to each local NFC-Application of the NFC R/W devices 23. In this case, the NEC-Application may maintain this credential in a list of authorized users who are allowed to receive services provided by the NFC-Application logic.

Step-S512: The NFC Application Bootstrap Server 42 returns the user credential and the application setting of the NFC-Application to the Bootstrap Controller 45 within the HTTPS tunnel.

Step-S513: The Bootstrap Controller 45 authenticates the mobile handset 20 based on the user credential to verify whether the mobile handset 20 is an allowed piece of user equipment or not. When both user credentials derived in the NFC Application Bootstrap Server 42 and the mobile handset 20 are equal, the authentication process is completed. This authentication process is important if this type of NFC service is charged to the user. If it is charged, it will be possible for the NFC service provider to charge the user through a mobile operator to which the user subscribes.

Step-S514: The Bootstrap Controller 45 sends the application setting to the mobile handset 20.

Step-S515: The mobile handset 20 installs the received application setting including the Service_Id and the use credential to the NFC chip.

At this point, the bootstrap has completed and both the mobile handset 20 and the NFC R/W devices 23 have moved to the state shown in FIG. 3.

Next, one example of services of the second embodiment of the invention, a personal door key service at the hotel, is presented.

A computer which holds a UICC (i.e. computer=UICC Hosting Device, e.g. IMS-enables computer) is equipped in a hotel check-in desk. A Guest who is checking-in at the hotel has his/her mobile handset (i.e. mobile handset=Remote Device). It is assumed that both the computer at the check-in desk and the mobile handset have a built-in NFC (Near field communication) chip that enables bilateral communication between the computer and the mobile handset.

The steps by the bootstrap in the second embodiment and the functional structure are the same as the steps FIG. 2 and FIG. 3 in the first embodiment. The structure shown in FIG. 6 of the first embodiment is a common structure in the second embodiment. The detailed steps are explained later using FIG. 8.

For security purposes, the desk clerk configures by using the computer, which doors in the hotel building the Guest can open. It is assumed that all the doors in the hotel building are equipped with an electric key system (i.e. doors=NFC R/W devices). For example, the Guest should be able to unlock the doors of his/her room, the hotel entrance, restaurants, a laundry room, etc. According to the customer database in the hotel, the Guest is determined to be a Gold member for the hotel, so the Guest is also allowed access to an exercising room in the hotel. This group of doors tailored for the Guest is configured in the online database of the hotel IT system (i.e. hotel IT system=NAF Key Centre). In order to complete the Guest's check-in process, the Guest is requested to touch his/her mobile handset to the NFC reader/writer interface of the computer, which triggers a bootstrapping of a user credential among the Guest's mobile handset and the doors which were just configured.

Since all the doors in the hotel have the NFC reader/writer interface, the Guest can unlock the doors which the Guest is authorized to unlock, by only touching his/her mobile phone to the doors. The door authenticates the Guest by checking if the presented user credential is stored in the local storage of the door.

Figure 7:
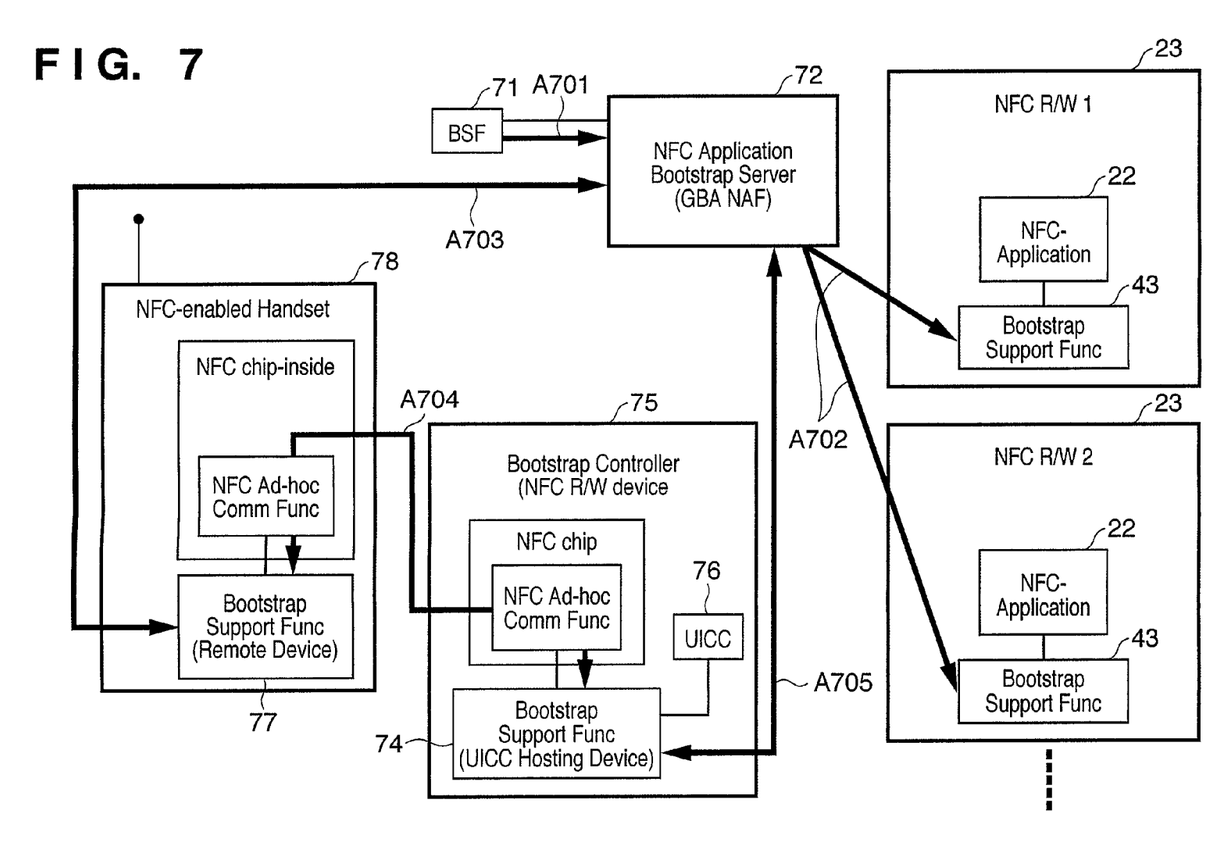
FIG. 7 shows an example of functional architecture when a bootstrap procedure is performed in the second embodiment.

Next, architecture for the second embodiment is explained using FIG. 7. In order to bootstrap the NFC application including the user credential in the mobile handset, the present invention introduces several functions in the relevant elements, such as Bootstrap Server Function 71, NFC Application Bootstrap Server 72, Bootstrap Support Functions 43 in NFC R/W device 23, Bootstrap Controller 75, and UICC 76 in the Bootstrap Controller 75.

The NFC Application Bootstrap Server 72 is the web application server of the NFC service provider. It is involved in the main architectural procedures indicated by A701, A702, A703 with following functionalities:
To act as a "NAF Key Centre" to obtain a key data (Ks_ext_NAF) from a Bootstrap Server Function (BSF) 71, which is then used to derive the user credential for a user (A701).
To deliver the derived user credential to a group of NFC R/W devices 23 through secure IT system of the NFC service provider (A702).
To send the user credential to Bootstrap Support Function 77 in the mobile handset 78 (A703) so that the Bootstrap Controller 75 can authenticate the mobile handset 78 using the user credential.

The Bootstrap Controller 75 is a device with a built-in NFC chip that is placed where the mobile handset 78 is about to bootstrap. The Bootstrap Controller 75 has Bootstrap Support Function 74 that has the following functionalities:
To configure a NFC service made personalized for the user in the NFC Application Bootstrap Server 72 (A705). A service identity associated with the configured service is sent to the Bootstrap Support Function 74 from the NFC Application Bootstrap Server 72.
To derive a key data (Ks_ext_NAF) from a local UICC 76 in the Bootstrap Controller 75 to further derive the user credential. In this sense, it acts as a "UICC Holding Device" defined in GBA TS33.259.
To establish a NFC link (A704) with the mobile handset 78 using for instance an NFC ad-hoc communication feature [5]. This feature has been introduced in NTT DoCoMo 903i series [4], which allows OBEX communication between the two NFC devices.
To receive the application setting from the NFC Application Bootstrap Server 72 (A705) that is to be sent over the NFC link to the mobile handset 78 after the mobile handset 78 is successfully authenticated by using the user credential (A704).

The Bootstrap Support Function 77 in the mobile handset 78 is a counterpart function to the one in the Bootstrap Controller 75 and has the following functionalities:
To receive the user credential from the NFC Application Bootstrap Server 72 (A703). In this sense, the Bootstrap Support Function 77 acts as a "Remote Device" defined in GBA TS33.259 [1].
To establish a NFC link (A704) with a Bootstrap Controller 75 using for instance the said NFC ad-hoc communication feature. Then, it is to be authenticated by a Bootstrap Controller 75 with the received user credential.
To receive the application setting for NFC-Application from a Bootstrap Controller 75 (A704) and install it on the local NFC chip. Then, the user credential and the Service_Id are stored inside Data block area of NFC-Application in the mobile handset 78. The Bootstrap Support Function 43 in the NFC R/W devices 23 has the following functionalities:
To receive the user credential, etc. from NFC Application Bootstrap Server 72 and to pass it to the local NFC-Application 22 (A702).

Figure 8:
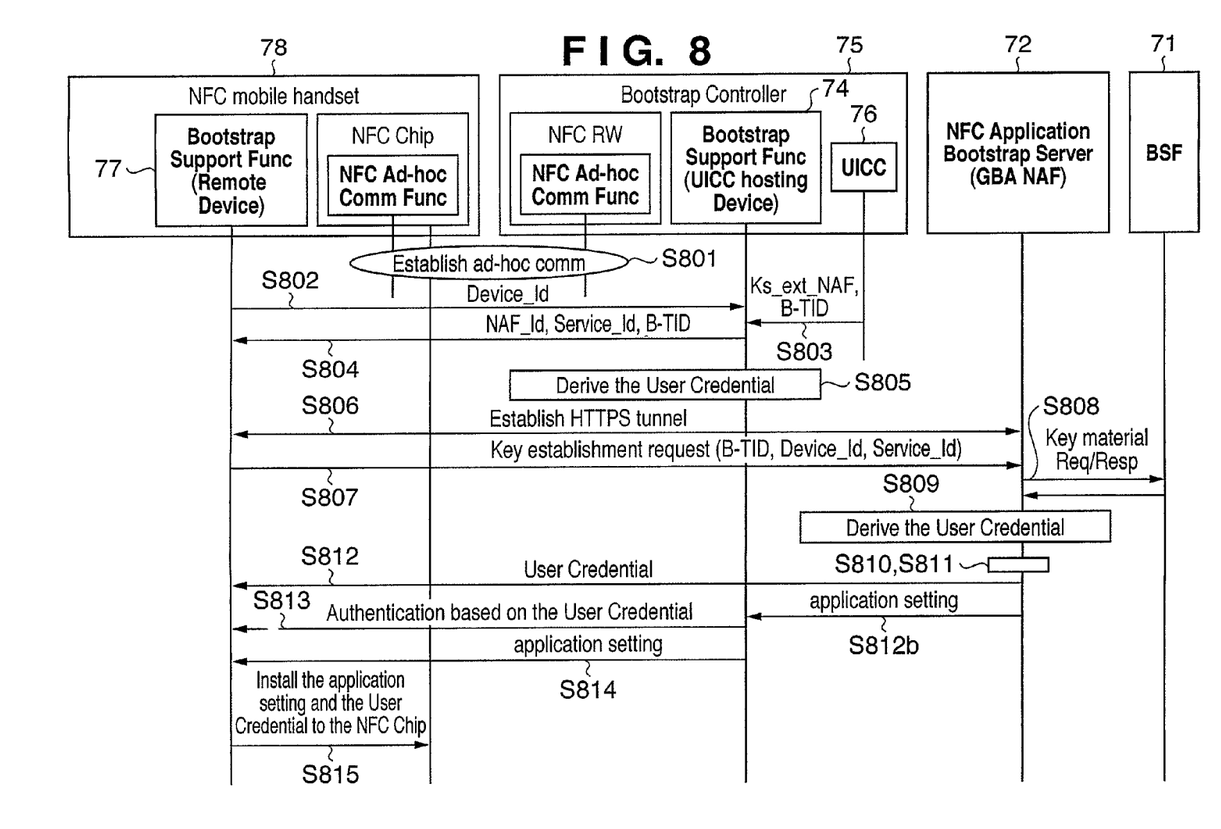
FIG. 8 shows an example of a detailed procedure of the second embodiment.

Before entering an actual bootstrap procedure, the following steps are necessary to configure a service for a user in the same way as shown in FIG. 4B. Following that configured service, a bootstrap of the NFC application in the second embodiment commences as shown in FIG. 8.

Step-S800: (This step is not presented in FIG. 8) It is a precondition that the UICC (76) in the bootstrap controller (75) runs a GBA bootstrap procedure with Bootstrap Support Function (71) before following steps. Otherwise, the bootstrap controller (75) runs it when necessary. For example, the clerk asks the user to wave his/her mobile handset 78 (or place it for a short time period) over an NFC interface connected to the counter's terminal computer acting as a Bootstrap Controller 75.

Step-S801: The user places the mobile handset 78 over the NFC interface (for NFC R/W device) of Bootstrap Controller 75, which triggers a Bootstrap Support Function 74 in the Bootstrap Controller 75 to establish an NFC ad-hoc communication link to the counterpart function in the mobile handset 78. As a result, two Bootstrap Support Functions 77, 74 in both devices (mobile handset 78 and Bootstrap Controller 75) start to communicate over the NFC ad-hoc communication link.

Step-S802: The mobile handset 78 delivers a Device_ID of the mobile handset to the Bootstrap Controller 75 and makes a request to start the bootstrap procedure.

Step-S803: The Bootstrap Support Function 74 in the Bootstrap Controller 75 (acting as GBA UICC Hosting Device) makes a request to a key data (Ks_ext_NAF) and key reference (B-TID) from the NAF_Id from the UICC of the Bootstrap Controller 75. If there is no valid key reference (B-TID) in the UICC 76, the UICC 76 runs a (GBA) bootstrap procedure with Bootstrap Server Function (BSF) 71. The UICC 76 returns new Ks_ext_NAF and new B-TID.

Step-S804: The Bootstrap Controller 75 initiates a bootstrap of an NFC-Application by sending NAF_Id of an NEC Application Bootstrap Server 72, Service_Id and the key reference (B-TID) to the mobile handset. In this case, Service_Id is a unique service identifier of the NFC service for this user to be bootstrapped.

Step-S805: The Bootstrap Controller 75 derives the user credential from the key data (Ks_ext_NAF), the key reference (B-TID), Device_Id, and Service_Id.

Step-S806: The Bootstrap Support Function 77 in the mobile handset 78 (acting as GBA Remote Device) and NFC Application Bootstrap Server 72 (GBA NAF) establish an HTTPS tunnel. When establishing the tunnel, the mobile handset 78 is authenticated by the NFC Application Bootstrap Server 72 based on a device certificate to verify whether the mobile handset 78 is a certified device or not.

Step-S807: The Bootstrap Support Function 77 in the mobile handset 78 sends a request to the NFC Application Bootstrap Server 72 within the HTTPS tunnel. The request message contains the key reference (B-TID), Device_Id and Service_Id, which are required for the NFC Application Bootstrap Server 72 to derive the user credential.

Step-S808: The NFC Application Bootstrap Server 72 (acting as GBA NAF) contacts Bootstrap Server Function 71 and sends the key reference (B-TID) and the NAF_Id in a key material request. BSF 71 returns the requested key materials including the key data (Ks_ext_NAF).

Step-S709: The NFC Application Bootstrap Server 72 derives the user credential from the key data (Ks_ext_NAF), the key reference (B-TID), Device_Id and Service_Id.

Step-S810: Referring to FIG. 6, The NFC Application Bootstrap Server 72 delivers the user credential and the Service_Id to the group of NFC R/W devices 23 by the Service_ID through a secure IT system of the NFC service provider. In addition to these parameters, the server may also send other personal service information to the group of NFC R/W devices 23 such as username (e.g. to display user's name on gate display), script codes to dynamically program the NFC R/W devices 23 to provide personalize services, user's age/sex, flight time, passport number, Star Alliance Gold member ID, etc. According to this information, the NFC R/W devices could provide the personalized services.

Step-S811: Referring to FIG. 6, a Bootstrap Support Function 43 of the NFC R/W devices 23 passes the received information to a local NFC-Application 22 of the NFC R/W devices 23. In this case, The NFC-Application 22 may maintain this credential in a list of authorized users who are allowed to receive the services provided by the NFC-Application.

Step-S812 and S812b: The NFC Application Bootstrap Server 72 returns the user credential to the mobile handset 78 within the HTTPS tunnel. The NFC Application Bootstrap Server 72 sends the application setting associated with the service identity to the Bootstrap Controller 75.

Step-S813: The Bootstrap Controller 75 indirectly authenticates the mobile handset 78 by verifying if the mobile handset 78 has successfully obtained the user credential from the NFC Application Bootstrap Server 72 or not. When both user credentials in the mobile handset 78 and the Bootstrap Controller 75 are equal, the authentication process is completed.

Step-S814: The Bootstrap Controller 75 sends the application setting to the mobile handset 78.

Step-S815: The mobile handset 78 installs the received application setting including the Service_Id and the user credential to the NFC chip of the mobile handset 78.

At this point, the bootstrap has completed and both the mobile handset 78 and the NFC R/W devices 23 have moved to the state as shown in FIG. 3.

While the principles of the invention have been described above in connection with specific first and second embodiments, it is clearly understood that this description is made only by way of the example and not as a limitation on the scope of the invention.

Although preferred embodiments of the method of apparatus of the present invention have been illustrated in the accompanying drawings and described in the foregoing description, it is understood that the invention is not limited to the embodiments disclosed but it is capable of numerous rearrangements, modifications and substitutions without departing from the spirit of the invention as set forth and defined in the following claims.

Abbreviations:
GBA Generic Bootstrapping Architecture
BSF Bootstrap Server Function
NFC Near Field Communication
OBEX Object Exchange protocol
R/W Reader/Writer
IMS IP Multimedia Subsystem

REFERENCES

3GPP TS 33.259 V1.0.0 (Release 7), "Key establishment between a UICC Hosting Device and a Remote Device"
Sony FeliCa web site, http://www.sony.net/Products/felica/abt/dvs.html
IT Media, Japanese web portal for IT news (only Japanese), 2005-09, http://www.itmedia.co.jp/enterprise/mobile/articles/0509/16/news039.html
NTT DoCoMo 903i series, http://www.nttdocomo.co.jp/english/product/foma/903i/index.html
NTT DoCoMo, i-appli Development Guide for DoJa-5.x/5.x LE V1.0, section 15.7, page 64 (only Japanese).
3GPP TS 33.110 v1.0.0, "Key establishment between a UICC and a terminal (Release 7)" (2006-06).

The invention claimed is:

1. A method in a communications system to provide services to a mobile handset using near field communication (NFC), the method comprising:
configuring services for the mobile handset at a bootstrap controller that is communicating with a NFC application bootstrap server;
determining a group of NFC application devices that the mobile handset can access at the NFC application bootstrap server and generating a service identity for the services;
sending the service identity from the NFC application bootstrap server to the bootstrap controller;
establishing a NFC link between the mobile handset and the bootstrap controller;
deriving a first user credential at the mobile handset or receiving the first user credential at the mobile handset from the NFC application bootstrap server;
sending the service identity, a second user credential and other service information to the group of NFC application devices;
receiving an application setting for the services at the mobile handset through the bootstrap controller via the NFC link between the mobile handset and the bootstrap controller; and
providing the services to the mobile handset at one of the group of NFC application devices, by a NFC link between the mobile handset and the one of the NFC application devices,
wherein the deriving the first user credential is based on data including a key data and a key reference obtained through a first bootstrap procedure between the mobile handset and the NFC application bootstrap server using mutual authentication, and
wherein the data including the key data and the key reference are stored in the mobile handset in response to the first bootstrap procedure and are verified to determine whether the key reference is valid or not, and when the key reference is not valid, the method further comprises obtaining another data including the key reference through a second bootstrap procedure between the mobile handset and the NFC application bootstrap server before the deriving the first user credential.

2. The method according to claim 1, after establishing the NFC link between the mobile handset and the bootstrap controller, sending a device identity of the bootstrap controller and the service identity from the bootstrap controller to the mobile handset.

3. The method according to claim 1, after establishing a NFC link between the mobile handset and the bootstrap controller, the method further comprises:
   sending a device identity of the mobile handset from the mobile handset to the bootstrap controller.

4. A method in a communications system to provide services to a mobile handset using near field communication (NFC), the method comprising:
   configuring services for the mobile handset at a bootstrap controller that is communicating with a NFC application bootstrap server;
   determining a group of NFC application devices that the mobile handset can access at the NFC application bootstrap server and generating a service identity for the services;
   sending the service identity from the NFC application bootstrap server to the bootstrap controller;
   establishing a NFC link between the mobile handset and the bootstrap controller;
   establishing a secure tunnel over the NFC link between the mobile handset and the NFC application bootstrap server based on a device certificate;
   performing authentication over the secure tunnel based on the device certificate;
   deriving a first user credential at the mobile handset or receiving the first user credential over the secure tunnel at the mobile handset from the NFC application bootstrap server;
   sending the service identity, a second user credential and other service information to the group of NFC application devices;
   receiving an application setting for the services at the mobile handset through the bootstrap controller via the NFC link between the mobile handset and the bootstrap controller; and
   providing the services to the mobile handset at one of the group of NFC application devices, by a NFC link between the mobile handset and the one of the NFC application devices.

5. A method in a communications system to provide services to a mobile handset using near field communication (NFC), the method comprising:
   configuring services for the mobile handset at a bootstrap controller that is communicating with a NFC application bootstrap server;
   determining a group of NFC application devices that the mobile handset can access at the NFC application bootstrap server and generating a service identity for the services;
   sending the service identity from the NFC application bootstrap server to the bootstrap controller;
   establishing a NFC link between the mobile handset and the bootstrap controller;
   deriving a first user credential at the mobile handset or receiving the first user credential at the mobile handset from the NFC application bootstrap server;
   sending the service identity, a second user credential and other service information to the group of NFC application devices;
   receiving an application setting for the services at the mobile handset through the bootstrap controller via the NFC link between the mobile handset and the bootstrap controller; and
   providing the services to the mobile handset at one of the group of NFC application devices, by a NFC link between the mobile handset and the one of the NFC application devices,
   wherein before receiving an application setting, the method further comprises authenticating the mobile handset at the bootstrap controller based on a comparison result that the first user credential is equal to the second user credential, derived in the NFC application bootstrap server,
   wherein before authenticating the mobile handset at the bootstrap controller, the method further comprises:
   sending a key reference included in the data from the mobile handset to the bootstrap controller;
   sending a key establishment request for the second user credential identifying the mobile handset from the bootstrap controller to the NFC application bootstrap server;
   sending a key material request including the key reference from the NFC application bootstrap server to the bootstrap server function,
   sending a key material response including the key material from the bootstrap server function to the NFC application bootstrap server;
   deriving the second user credential identifying the mobile handset at the NFC application bootstrap server based on the key material response; and
   sending the second user credential and the application setting from the NFC application bootstrap server to the bootstrap controller.

6. The method according to claim 5, wherein the deriving the second user credential is based on data including a key data and a key reference obtained through a bootstrap procedure between the bootstrap controller and a NFC application bootstrap server using mutual authentication.

7. The method according to claim 6, wherein the data is stored in the bootstrap controller by the bootstrap procedure and is verified to determine whether the key reference is valid, and when the key reference is not valid, another data is obtained through another bootstrap procedure before deriving the second user credential.

8. The method according to claim 4, wherein before receiving the application setting for the services, the method further comprises:
   verifying by comparison at the bootstrap controller that the first user credential is equal to a second user credential, derived in the NFC application bootstrap server, thereby indirectly authenticating the mobile handset.

9. The method according to claim 8, wherein the verifying by comparison at the bootstrap controller comprises:
   sending a key reference included in the data from the bootstrap controller to the mobile handset;
   sending a key establishment request for the first user credential identifying the mobile handset from the mobile handset to the NFC application bootstrap server;
   sending a key material request including the key reference from the NFC application bootstrap server to the bootstrap server function;

sending a key material response including the key material from the bootstrap server function to the NFC application bootstrap server;

deriving the first user credential identifying the mobile handset at the NFC application bootstrap server based on the key material;

sending the first user credential identifying the mobile handset from the NFC application bootstrap server to the mobile handset; and sending the application setting for the services from the NFC application bootstrap server to the bootstrap controller.

10. A NFC application bootstrap server, comprising:
a first network interface to a bootstrap controller;
a second network interface to a mobile handset;
a third network interface to a bootstrap server function;
a fourth network interface to the group of NFC application devices; and
circuitry configured to receive service information from the bootstrap controller through the first network interface, to provide application setting for a mobile handset through the first network interface, to receive through the second network interface a key establishment request to derive a user credential and to provide the user credential, to receive through the third network interface key material to configure services and a group of NFC application devices by using the service information and generating a service identity for the services that the mobile handset can access, to send the user credential, the service identity and other service information through the third network interface, and to derive a user credential using the key material.

11. The NFC application bootstrap server according to claim 10, wherein the circuitry is further configured to distribute the service identity and the user credential to the group of NFC application devices.

* * * * *

UNITED STATES PATENT AND TRADEMARK OFFICE
CERTIFICATE OF CORRECTION

PATENT NO. : 8,646,034 B2  
APPLICATION NO. : 12/935721  
DATED : February 4, 2014  
INVENTOR(S) : Murakami et al.

Page 1 of 1

It is certified that error appears in the above-identified patent and that said Letters Patent is hereby corrected as shown below:

In the Specification

In Column 8, Line 15, delete "NEC" and insert -- NFC --, therefor.

In Column 8, Line 28, delete "NEC-Application" and insert -- NFC- Application --, therefor.

In Column 10, Line 63, delete "NEC" and insert -- NFC --, therefor.

In Column 11, Line 22, delete "Step-S709:" and insert -- Step-S809: --, therefor.

Signed and Sealed this
Twenty-second Day of July, 2014

Michelle K. Lee
*Deputy Director of the United States Patent and Trademark Office*